No. 664,974. Patented Jan. 1, 1901.
B. T. SEARING.
FILTER.
(Application filed May 13, 1899.)
(No Model.)
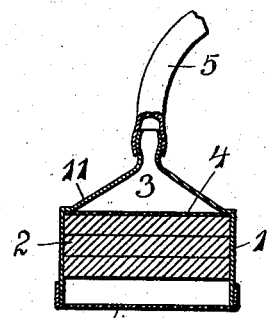
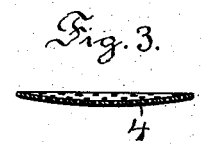
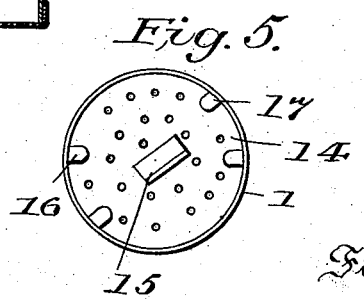
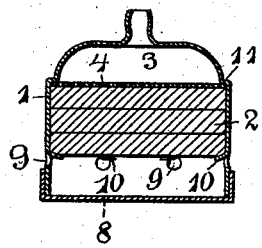
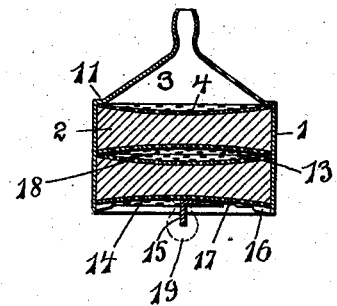
Witnesses:—
W. H. Graham
Axl V. Beeken
Inventor
Benjamin T. Searing
by G. H. Graham
his attorney.

UNITED STATES PATENT OFFICE.

BENJAMIN T. SEARING, OF GARDEN CITY, NEW YORK, ASSIGNOR TO WELLESLEY W. GAGE, OF NEW YORK, N. Y.

FILTER.

SPECIFICATION forming part of Letters Patent No. 664,974, dated January 1, 1901.

Application filed May 13, 1899. Serial No. 716,774. (No model.)

*To all whom it may concern:*

Be it known that I, BENJAMIN T. SEARING, a citizen of the United States, and a resident of Garden City, in the county of Nassau and State of New York, have invented certain new and useful Improvements in Filters, of which the following is a specification.

The present invention relates to filters of that kind in which the liquid to be filtered is drawn through the filtering material by suction produced in any manner, as by a pump or siphon, or by the mouth of the person desiring to drink the filtered liquid. It has for its object a thoroughly efficient filter particularly adapted to the use for which it is made, and especially to its employment as a mouth-filter for filtering drinking fluid of comparative impurity.

The improved filter consists of a casing preferably cylindrical in form and containing one or more filtering-disks secured in position by projections or lugs upon the casing and composed of any suitable material, such as that described herein or in the application of Gage and Searing, Serial No. 698,928, filed December 10, 1898. The casing is open at or near its lower end to the source of the liquid to be filtered, while its upper end is provided with an outlet in communication with a pipe or tube through which the fluid is sucked or drawn or siphoned. In order to allow the fluid to be easily drawn through the filtering material and to secure a gradual application of the suction-power to the liquid, whereby the device may be used more conveniently as a mouth-filter, a space or well is formed between the outlet of the casing and the filtering-disks for containing a quantity of air, which, while being exhausted by suction applied to the outlet-tube, gradually draws the liquid through the successive layers of filtering material.

The invention also has for its object the production of an efficient and cheap filtering material which is made in the form required from a filtering fabric or felt of an improved composition.

An improved filtering material consists, essentially, of a fiber known as "pine-needle" wool or "fir-wool," a fibrous substance produced from the leaves of the pine. A quantity of animal wool, cotton, linen, jute, or wood-pulp fiber or other suitable fiber, preferably, is added to the pine-needle wool before or during felting or weaving or otherwise making into fabric in order to make the filtering material more coherent and porous and to enable the pine-needle wool to be formed into a yarn or woven more readily.

When making a fabric of pine-needle wool and animal wool only, the proportions may be equal or as little as fifteen per cent. or twenty per cent. of the pine-needle wool, and when adding cotton the constituents approximately may be in the proportions of thirty per cent., sixty per cent., and ten per cent., respectively. It is obvious, however, that any suitable proportion of the constituents may be made within the limits of the invention.

In the accompanying drawings, Figure 1 is a vertical section, partly in elevation, of the improved filter. Fig. 2 is a similar view of a modified form of the filter-casing inlet. Fig. 3 is a cross-sectional view of the perforated plate separating the filtering-disks from the air-well. Fig. 4 is a cross-sectional view of a filter, showing an improved separating-disk between the filtering-pads and another modified casing-inlet. Fig. 5 is a bottom view of the form of filter shown in Fig. 4.

Referring to the drawings, the casing 1 contains a number of filtering-disks 2, separated from the well or space 3 in the upper portion of the filter by a perforated plate or disk of gauze 4, which may present a convex side to the filtering material (see Figs. 3 and 4) and is held against a shoulder 11, formed in the casing. The well is in communication with a pipe or tube 5, which is provided with a mouthpiece 6 and is employed to suspend the casing, so that any convenient position relative to the filter may be attained by the user. The bottom of the casing is covered with a detachable perforated cap 7, which is removed when the filter is to be cleaned or refilled with fresh filtering material.

When using the filter for filtering water containing a thick or slimy sediment to which the casing may be lowered inadvertently, the foreign matter is prevented from entering the filter by employing a solid cap 8 (see Fig. 2)

and forming openings 9 in the side of the casing provided with inturned ears or lugs 10, which are adapted to support the filtering-disks.

Referring to Fig. 4, the filtering-disks are preferably separated from each other by one or more lenticular disks, each consisting of two perforated plates 13 13, placed together, with their concave sides adjacent to each other, whereby the disk may be made simple and cheap as well as efficient and may form a second well 18 for a similar purpose to that of the well 3 already described. The inlet-opening is preferably provided with a perforated disk 24, with a convex side toward the adjacent filtering-pad, so that, together with the separating-disks, the filtering material may be forced against the side of the casing to prevent escape and flow of water around their edges. The lower disk 14 is held in place above the lugs 16 on the casing and may be detached by turning it by means of the plane-sided projection 15 until the notch 17 registers with one of the lugs.

The inlet-plate may be provided with a knob 19 for detaching it from the casing and to prevent the filter from sinking in any sediment in which it may be placed.

What is claimed is—

1. The herein-described fabric consisting of pine-needle wool and another fiber adapted to be made into felt or fabric.

2. The herein-described fabric or felt consisting of pine-needle wool and animal wool.

3. The herein-described fabric or felt consisting of pine-needle wool, animal wool and cotton.

4. The herein-described filtering material consisting of pine-needle wool intermingled with another fiber and formed into pads.

5. The herein-described filtering material consisting of pine-needle wool intermingled with animal wool and formed into pads.

6. The herein-described filtering body or pad, consisting of a mixture of pine-needle wool, animal wool, and cotton.

7. In a filter adapted to be used with suction-power, the combination of a casing, an outlet, a body of filtering material within the said casing, a closed end to the said casing, side openings entering the casing, and lugs projecting inwardly and adapted to support the filtering material, as described.

Signed at New York, in the county of New York and State of New York, this 7th day of April, A. D. 1899.

BENJAMIN T. SEARING.

Witnesses:
FLORENCE ROSENSTEEL,
AXEL V. BEEKEN.